Figure 1:
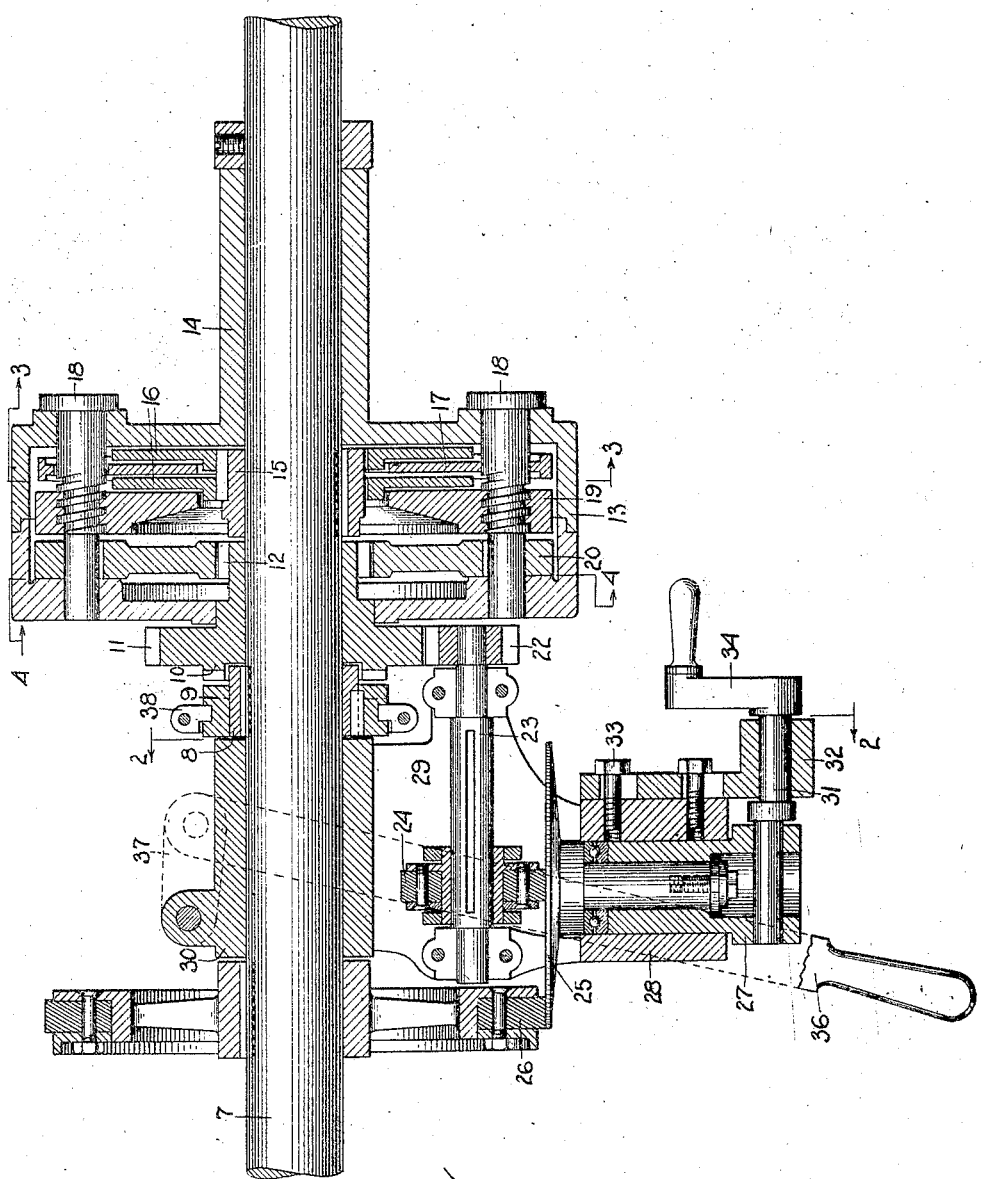

S. P. WHITESIDE.
CLUTCH.
APPLICATION FILED NOV. 21, 1914.

1,178,280.

Patented Apr. 4, 1916.
3 SHEETS—SHEET 1.

WITNESSES
F. D. Sweet
B. Joffe

INVENTOR
Samuel P. Whiteside
BY Munn & Co
ATTORNEYS

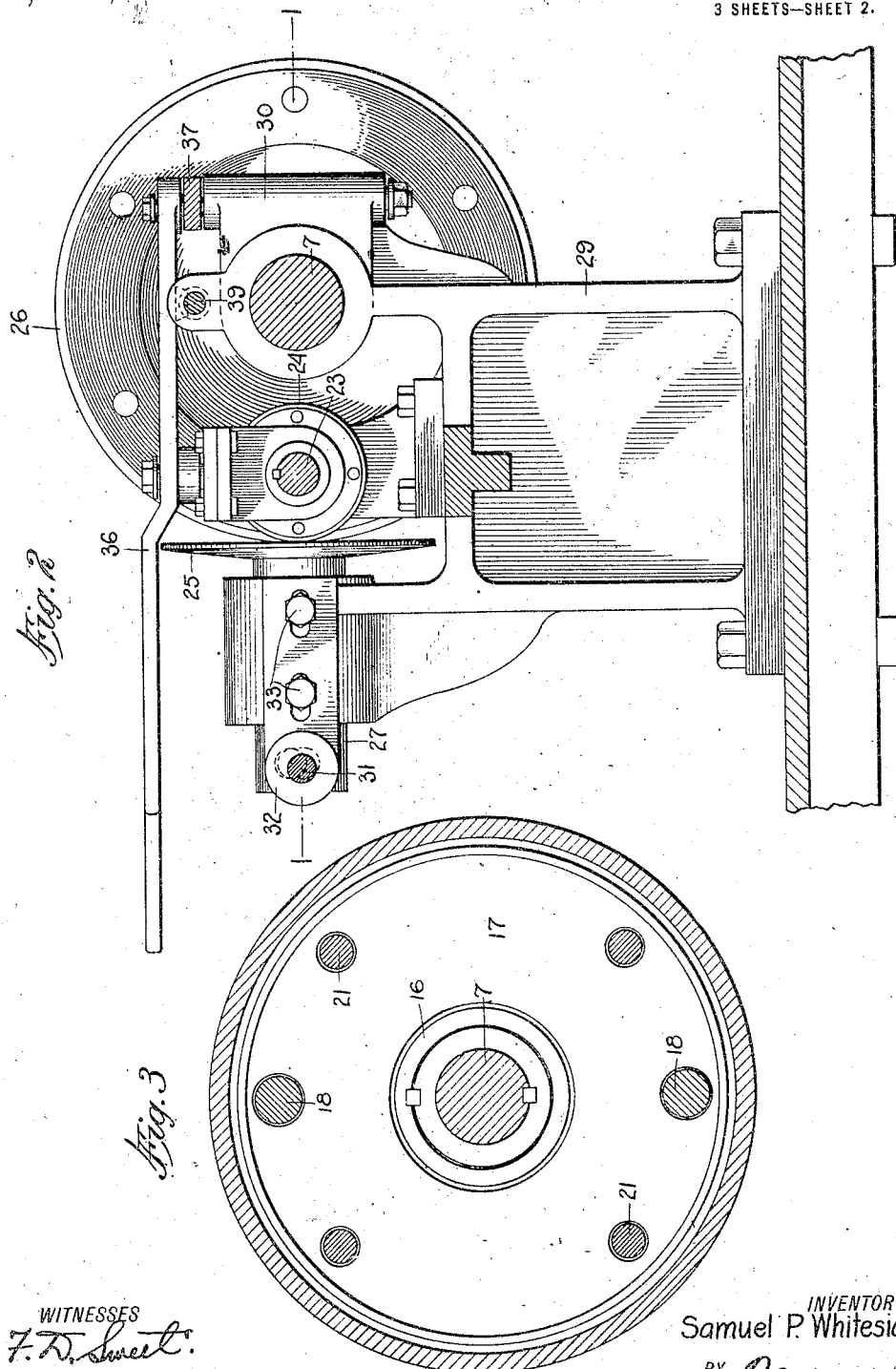

S. P. WHITESIDE.
CLUTCH.
APPLICATION FILED NOV. 21, 1914.
1,178,280.
Patented Apr. 4, 1916.
3 SHEETS—SHEET 3.
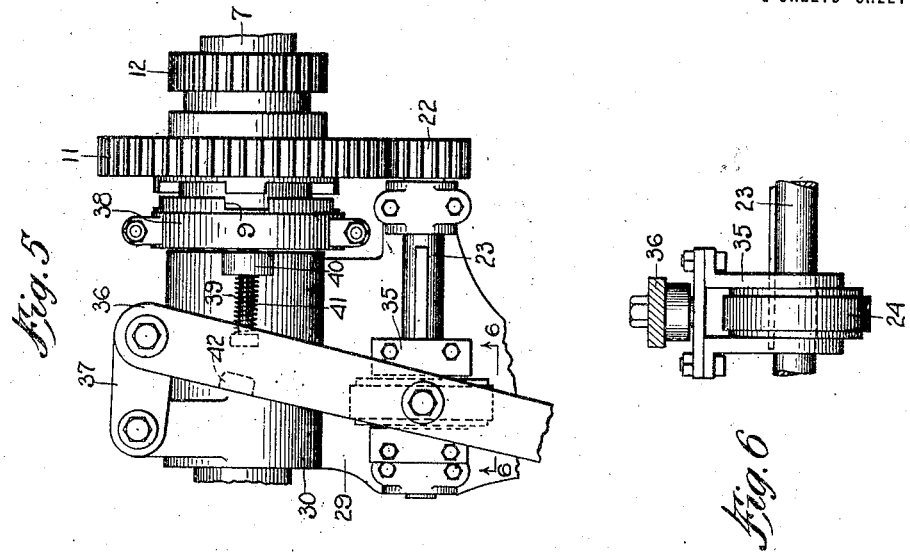
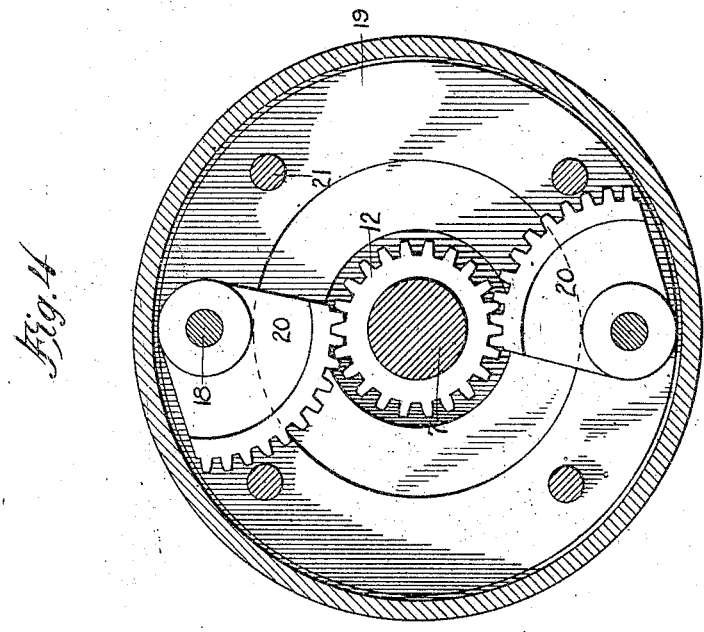
WITNESSES
INVENTOR
Samuel P. Whiteside
BY
ATTORNEYS

UNITED STATES PATENT OFFICE.

SAMUEL P. WHITESIDE, OF CURTIS BAY, MARYLAND.

CLUTCH.

1,178,280.  Specification of Letters Patent.  Patented Apr. 4, 1916.

Application filed November 21, 1914. Serial No. 873,306.

*To all whom it may concern:*

Be it known that I, SAMUEL P. WHITESIDE, a citizen of the United States, and a resident of Curtis Bay, in the county of Anne Arundel and State of Maryland, have invented a new and Improved Clutch, of which the following is a full, clear, and exact description.

My invention relates to clutches whereby a driving and a driven member can be first slipably connected, to bring the two members to substantially the same speed, and then positively coupled.

The object of the invention is to provide a simple, efficient, and strong transmission clutch whereby a driving and a driven member can be positively coupled without danger of injury to the parts of the clutch mechanism.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views, and Figure 1 is a horizontal section of an embodiment of my invention on line 1—1, Fig. 2; Fig. 2 is a section on line 2—2, Fig. 1; Fig. 3 is a section on line 3—3, Fig. 1; Fig. 4 is a section on line 4—4, Fig. 1; Fig. 5 is a plan of a fragment of the device; and Fig. 6 is a section on line 6—6, Fig. 5.

My invention is characterized by the provision of clutch members carried by driving and driven members and controllable by a speed-controlling device, preferably of the frictional type, whereby any desired speed can be given to the clutch members on the driven member. It is understood that said speed cannot exceed the speed of the clutch member on the driving member.

Referring to the drawings, 7 is a driving shaft to which is keyed a collar 8 and on which collar is mounted to slide and constrained to rotate therewith a positive clutch member 9. A co-acting, positive clutch member 10 is mounted to turn freely on the driving shaft 7 adjacent the collar 8. The said clutch member 10 has formed integrally therewith gears 11 and 12 spaced to accommodate therebetween the end wall of the friction clutch casing 13, so that the gear 12 is located within the casing.

The friction clutch casing is preferably formed of two sections, one bearing on the clutch member 10 and the other provided with a sleeve 14 bearing on the driving shaft 7. This sleeve constitutes the driven member, which may be connected to or provided with any suitable means for transmitting the movement from the driving shaft 7.

Positioned within the casing 13 is a hub 15 keyed to the shaft 7 and on which hub spaced friction disks 16 are mounted to slide and constrained to rotate with the hub. Positioned intermediate the friction disks 16 is a friction disk 17 supported in and connected to the casing by diametrically opposite screws 18 mounted to bear in the sections of the casing 13. The threaded part of the screws 18 is in engagement with a friction disk 19. Keyed to each of the screws is a toothed sector 20 which meshes with the gear 12. When the sectors are actuated the screws are rotated and, consequently, the friction disks within the friction casing are moved relatively in accordance with the movement of the sectors. The sections of the friction casing can be connected in any suitable way, but preferably bolts 21 are provided which have countersunk heads in the end wall of the casing adjacent the gear 11.

Meshing with the gear 11 is a pinion 22 keyed to a secondary shaft 23 mounted to rotate parallelly to the main shaft 7. Mounted to slide and constrained to rotate on the secondary shaft 23 is a friction gear 24 which is in frictional contact with a transmission or driving friction disk 25, in turn in frictional engagement with a friction wheel 26 keyed to the driving shaft 7. The driving friction disk 25 is mounted to rotate in a bushing 27 mounted to slide in a bearing 28 forming part of a frame 29 of which the main bearing 30 carrying the shaft 7 is a part. The movement of the bushing 27 is controlled by a crank shaft 31, one part of which bears in an elongated slot in the bushing and the other in the bracket 32 connected to the bearing 28 by means of screws 33, which screws permit an adjustment of said bracket. The end of the crank shaft 31 projecting through the bracket 32 is provided with a handle 34, whereby the pressure of the driving disk 25 on the friction gear and wheel is controlled.

A fork 35, which engages the friction gear 24, is pivotally connected to a lever 36, one end of which lever is, in turn, connected by a link 37 to a lug forming an integral part of the bearing 30, the other end of the lever being provided with a suitable grip for manipulating the lever. As the lever 36 is moved to the right, in Fig. 1, the friction driving disk 25 is forced against the friction wheel and friction gear by means of the handle 34, and the said friction gear will rotate in a direction opposite to the rotation of the friction wheel 26, revolving the gear 11 in the same direction as the driving shaft 7. By properly proportioning the friction driving disk 25, the friction gear 24, friction wheel 26 and pinion 22, the gear 11 can be made to revolve at any speed from a stand still to that of the speed of the driving shaft 7.

As the gear 12 turns with the gear 11, the sectors 20 meshing therewith will be caused to turn, consequently turning the screws 18 and clamping the friction disks 19 and 17 to the friction disks 16. If the friction disks 16 should suddenly grip the friction disks 17 and 19 and set the friction casing 13 in rotation with the speed of the driving shaft 7 and the gear 12 did not reach the same speed, the casing will run ahead of the gear, turning the sectors back toward their original position until the friction disks slip. In this way the speed of the friction casing 13 and members connected thereto is always governed by the gear 12, the speed of which gear is under the control of lever 36 which slides the friction gear 24.

The positive clutch member 9 is engaged by a collar 38, which collar has a stud 39 sliding in a lug 40 provided on the bearing 30 of the frame. A spring 41 is provided on the stud 39 which normally tends to bring the collar 38 toward the bearing 30, that is, it tends to disengage the positive clutch member 9 from the positive clutch member 10. The length of the stud 39 is such that it will be engaged by a lug 42 of the lever 36 when the speed of the gear 11 has reached substantially that of the driving shaft 7 through the displacement of the friction gear 24 by means of the lever 36. After the two positive clutch members 9 and 10 have been brought into engagement by means of the lever 36, the handle 34 may be rotated to disengage the driving friction disk 25 from the friction wheel 26 and the friction gear 24. It is self-evident that if desired the collar 38 can be moved by a separate lever in lieu of the lever 36 by which the lug 42 strikes the stud 39 when the full speed position of the positive clutch member 10 is attained.

From the above description it will be seen,—that by means of the friction gearing formed by the friction driving disk 25, friction gear 24, and friction wheel 26, I control a friction clutch formed by the friction disks 16, 17 and 19; that by means of the said friction gearing I bring one of the positive clutch members substantially to the speed of the other connected to the driving member before they are coupled; and that the control of the frictional clutch by means of the frictional gear is so arranged that the frictional clutch cannot be suddenly set in motion but is brought gradually to the speed of the shaft by which it is to be driven.

In cases where the clutch is to be used with machinery requiring frequent interruption of transmission by means of the clutch, the use of the positive clutch member can be dispensed with, particularly in cases where the clutch is of small size and used in connection with high-speed drive and of low power.

From the foregoing description, taken in connection with the accompanying drawings, the advantage of the construction and operation of the clutch shown will be readily understood by those skilled in the art to which the invention pertains, and while I have described the principle of operation, together with the contrivance which I now consider to be the best embodiment thereof, I desire to have it understood that the clutch shown is merely illustrative and that such changes may be made as are within the scope of the appended claims.

Having thus described my invention, I claim as new and desire to secure by Letters Patent:

1. In a clutch, a driving member, a driven member, means for coupling said members, a variable speed mechanism controlling said means, means for rendering said variable speed mechanism inoperative after the driven and driving members have been coupled and means for maintaining the members coupled after the variable speed mechanism has been rendered inoperative.

2. In a clutch, a driving member, a driven member, friction elements carried by said members, a friction wheel carried by the driving member, a friction disk associated with said friction wheel, a friction roller associated with the friction disk, motion-transmission means from the roller to the friction elements on the driven member for bringing said elements into engagement with the friction elements of the driving member, means for moving the friction roller relative to the friction disk whereby the motion-transmission means are actuated, a clutch member associated with the motion-transmission means, a coöperating clutch member associated with the driving member, said means for moving the frictional roller adapted to bring said coupling members into engagement after the speed of the driven member is brought substantially to that of the driving member through the medium of the friction elements, and means for breaking the engagement between the friction disk with the friction wheel and roller after the coupling members have been engaged.

3. In a clutch, a driving member, a driven member, friction elements carried by said members, a friction wheel on the driving member, a friction disk associated with said wheel and mounted to slide relative to said wheel, means for moving said disk to and from said wheel, a friction roller associated with said disk and mounted to move laterally thereof, motion transmitting means connecting said roller to the coupling means of the driven member, means for coupling the motion-transmission means to the driving member, and means for moving said frictional roller adapted to operate the said coupling means.

4. In a clutch, a driving member, a driven member, frictional disks carried by each of said members, a positive clutch member mounted to slide and constrained to rotate with the driving member, a second coöperating clutch member on the driving member free to turn thereon, means connecting it to the disks of the driven member whereby they are operated, a variable-speed mechanism actuated by the driving member and controlling the speed of said second clutch member, and means controlling the variable speed mechanism and the sliding movement of the first clutch member.

5. In a clutch, a driving member, a driven member, friction disks carried by each of said members, a positive clutch member mounted to slide on and constrained to rotate with the driving member, a second positive clutch member on the driving member free to turn thereon and adapted to co-act with the first clutch member, a variable-speed mechanism actuated by the driving member controlling the speed of said second clutch member, means for actuating the disks of the driven member associated with the second clutch member whereby the engagement of the disks of the driven and driving member are controlled, and means controlling the variable speed mechanism, including means for controlling the engagement of the first clutch member with the second clutch member.

6. In a clutch, a driving member, a driven member, a friction disk carried by each of said members, screws engaging the disk carried by the driven member, a toothed sector associated with each of the screws, a positive clutch member free to rotate on the driving member having a gear meshing with the toothed sectors, said positive clutch member having a second gear, a variable speed mechanism engaging said gear whereby the speed of said positive clutch member can be varied and whereby said disk of the driven member can be brought in contact with the disk of the driving member, a positive clutch member on the driving member mounted to slide thereon but constrained to rotate therewith, and means for bringing said last mentioned clutch member into engagement with the first mentioned clutch member.

7. In a clutch, a driving member, a driven member, friction elements associated with the driving and the driven members, clutch members associated with the driving and the driven members, a variable speed control associated with the clutch member of the driven member whereby the speed of the same is controlled, means intermediate the clutch member of the driven member and the friction element of the same member whereby the frictional engagement between said driving and driven members is controlled through the medium of the clutch member on said driven member, and means for bringing the clutch members into engagement.

8. In a clutch, a driving member, a driven member, friction elements carried by said driving and driven members, a friction wheel on said driving member, a friction disk associated with said friction wheel, a friction roller associated with said friction disk, friction elements operating means from said friction roller to said friction element carried by said driven member, means for moving said friction roller relative to the friction disk whereby the engagement of said friction elements is controlled, and means for connecting the friction elements operating means directly with the driving member, said connecting means being controlled by the means for moving said friction roller.

9. In a clutch, a driving member, a driven member, friction elements carried by said driving and driven members, a friction wheel on said driving member, a friction disk associated with said friction wheel, a friction roller associated with said friction disk, friction elements operating means between said roller and the friction elements on the driven member, means for moving said friction roller relative to the friction disk whereby the engagement of said friction elements is controlled, and means for connecting the friction elements operating means directly with the driving member operable by said means for moving said friction roller after a predetermined displacement of said roller from its inoperative position.

10. In a clutch, a driving member, a driven member, means for coupling said members frictionally, a friction wheel carried by the driving member, a friction disk associated with the friction wheel, a friction roller coacting with the friction disk and associated with the means for coupling the members, and means for disengaging said disk from said wheel and roller.

11. In a clutch, frictional members, means controlling said members, a variable-speed mechanism for operating said means, and means associated with said controlling means for maintaining said frictional members in engagement after said frictional members have been engaged by means of said variable speed mechanism.

12. In a clutch, frictional members, frictional members operating means, a variable-speed frictional gearing controlling said means, means for maintaining the engagement between the frictional members after the same has been established, means controlling the frictional gearing and said second mentioned means, and means for rendering said frictional gearing inoperative.

13. In a clutch, a driving member, a driven member, means for coupling said members, a variable speed mechanism controlling said means, means for maintaining said members in coupled position, and means for rendering said variable speed mechanism inoperative after the driven and driving members have been coupled.

14. In a clutch, a driving member, a driven member, friction elements carried by said driving and driven members, friction elements operating means associated with the friction elements of the driven member, a positive coupling member carried by said driving member, a coöperating positive coupling member associated with the friction elements operating means, a variable speed mechanism actuated from the driving member engaging the coupling elements operating means, whereby the slipable connection between the driving and driven members is controlled, and means controlling the variable speed mechanism and associated with said positive coupling member carried by said driving member, whereby said positive coupling members are engaged after the slipable engagement has been established.

15. In a clutch, a driving member, a driven member, frictional elements for coupling said members together, frictional elements operating means, a variable speed mechanism associated with the frictional elements operating means whereby the frictional elements are controlled, means interposed between the driving member and the frictional elements operating means for maintaining the frictional elements in contact independently of the variable speed mechanism, means controlling the variable speed mechanism and the means interposed between the driving member and the frictional elements operating means, said means interposed between the driving member and the frictional elements operating means becoming operative after the variable speed mechanism has brought the frictional elements into engagement, and means for rendering said speed mechanism inoperative after said means interposed between the driving member and the frictional elements operating means has been rendered operative.

16. In a clutch, a driving member, a driven member, means for coupling said members frictionally, a variable-speed mechanism controlling the coupling means and whereby said driving and driven member may be coupled or uncoupled, means for rendering the variable-speed mechanism inoperative, and means whereby the members can be maintained coupled when the speed mechanism has been rendered inoperative.

In testimony whereof I have signed my name to this specification in the presence of two subscribing witnesses.

SAMUEL P. WHITESIDE.

Witnesses:
 DAN'L F. REISENWEBER,
 LOUIS O. HILDEBRAND.